United States Patent
Kurutach et al.

(10) Patent No.: US 12,420,791 B2
(45) Date of Patent: Sep. 23, 2025

(54) AUTONOMOUS VEHICLE PREDICTION LAYER TRAINING

(71) Applicant: GM Cruise Holdings LLC, San Francisco, CA (US)

(72) Inventors: Thanard Kurutach, Carrboro, NC (US); Ariel Arturo Perez Chavez, Mountain View, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 199 days.

(21) Appl. No.: 18/158,424

(22) Filed: Jan. 23, 2023

(65) Prior Publication Data
US 2024/0246537 A1    Jul. 25, 2024

(51) Int. Cl.
| | |
|---|---|
| *B60W 30/16* | (2020.01) |
| *B60W 50/00* | (2006.01) |
| *B60W 60/00* | (2020.01) |
| *G06N 3/08* | (2023.01) |

(52) U.S. Cl.
CPC ........ *B60W 30/16* (2013.01); *B60W 50/0097* (2013.01); *B60W 60/0011* (2020.02); *B60W 60/0015* (2020.02); *B60W 60/00274* (2020.02); *G06N 3/08* (2013.01); *B60W 2420/408* (2024.01); *B60W 2420/54* (2013.01); *B60W 2554/4045* (2020.02); *B60W 2554/80* (2020.02);
(Continued)

(58) Field of Classification Search
CPC ............ B60W 30/16; B60W 50/0097; B60W 60/0011; B60W 60/0015; B60W 60/00274; B60W 2420/408; B60W 2420/54; B60W 2554/4045; B60W 2554/80; B60W 2554/40; B60W 2554/50; G06N 3/08

USPC .......................................................... 701/96
See application file for complete search history.

(56) References Cited

U.S. PATENT DOCUMENTS

| | | | |
|---|---|---|---|
| 9,229,453 B1 * | 1/2016 | Lee ...................... | B60W 30/12 |
| 11,409,295 B1 * | 8/2022 | Samdaria ............. | G05D 1/0217 |
| 12,077,186 B1 * | 9/2024 | Schleede ........... | B60W 60/0016 |

(Continued)

FOREIGN PATENT DOCUMENTS

DE    102020115778 A1 *  12/2021

OTHER PUBLICATIONS

English translation of DE-102020115778-A1, obtained via Espacenet Sep. 2024 (Year: 2024).*

*Primary Examiner* — Krishnan Ramesh
(74) *Attorney, Agent, or Firm* — Honigman LLP; Matthew H. Szalach; Jonathan P. O'Brien

(57) ABSTRACT

The present disclosure generally relates to autonomous vehicle (AV) training and, more specifically, to AV prediction layer training. In some aspects, the present disclosure provides a process for receiving road data representing a real-world environment encountered by an AV and generating, using a prediction layer of the AV, a predicted trajectory of a target vehicle, wherein the predicted trajectory comprises one or more waypoints and wherein the predicted trajectory is based on the road data. In some aspects, the process can further include steps for calculating a distance metric for the predicted trajectory, wherein the distance metric is based on a distance between the one or more waypoints and one or more corresponding drivable areas and updating the prediction layer of the AV based on the distance metric. Systems and machine-readable media are also provided.

17 Claims, 8 Drawing Sheets

(52) U.S. Cl.
    CPC ..... *B60W 2556/40* (2020.02); *B60W 2556/50* (2020.02)

(56)                    References Cited

U.S. PATENT DOCUMENTS

| | | |
|---|---|---|
| 12,091,003 B1* | 9/2024 | Akella .............. B60W 30/0956 |
| 2014/0278047 A1* | 9/2014 | Bahl ...................... G08G 1/164 |
| | | 701/301 |
| 2019/0178678 A1* | 6/2019 | Rahbari Asr ........... B60L 53/66 |
| 2021/0261124 A1* | 8/2021 | Niewiadomski ...... B60W 30/06 |
| 2021/0269059 A1* | 9/2021 | Djuric ................ B60W 60/0011 |
| 2022/0227397 A1* | 7/2022 | Jiang ....................... G06F 30/15 |
| 2023/0099853 A1* | 3/2023 | Mangas ................. B60W 40/02 |
| 2024/0059312 A1* | 2/2024 | Mulligan .......... B60W 50/0097 |
| 2024/0140488 A1* | 5/2024 | Choi ................. B60W 60/0018 |

* cited by examiner

AUTONOMOUS VEHICLE PREDICTION LAYER TRAINING

BACKGROUND

1. Technical Field

The present disclosure generally relates to autonomous vehicle (AV) training and, more specifically, to improving AV trajectory predictions about other objects or entities (e.g., target vehicles) by improving training performed on a prediction layer of the AV software stack.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide safe and efficient transportation. Such tasks may require the collection and processing of large quantities of data using various sensor types, including but not limited to cameras, Light Detection and Ranging (LiDAR) sensors, and/or Radio Detection and Ranging (RADAR) disposed on the AV. In some instances, the collected data can be used to perform additional AV testing and training.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
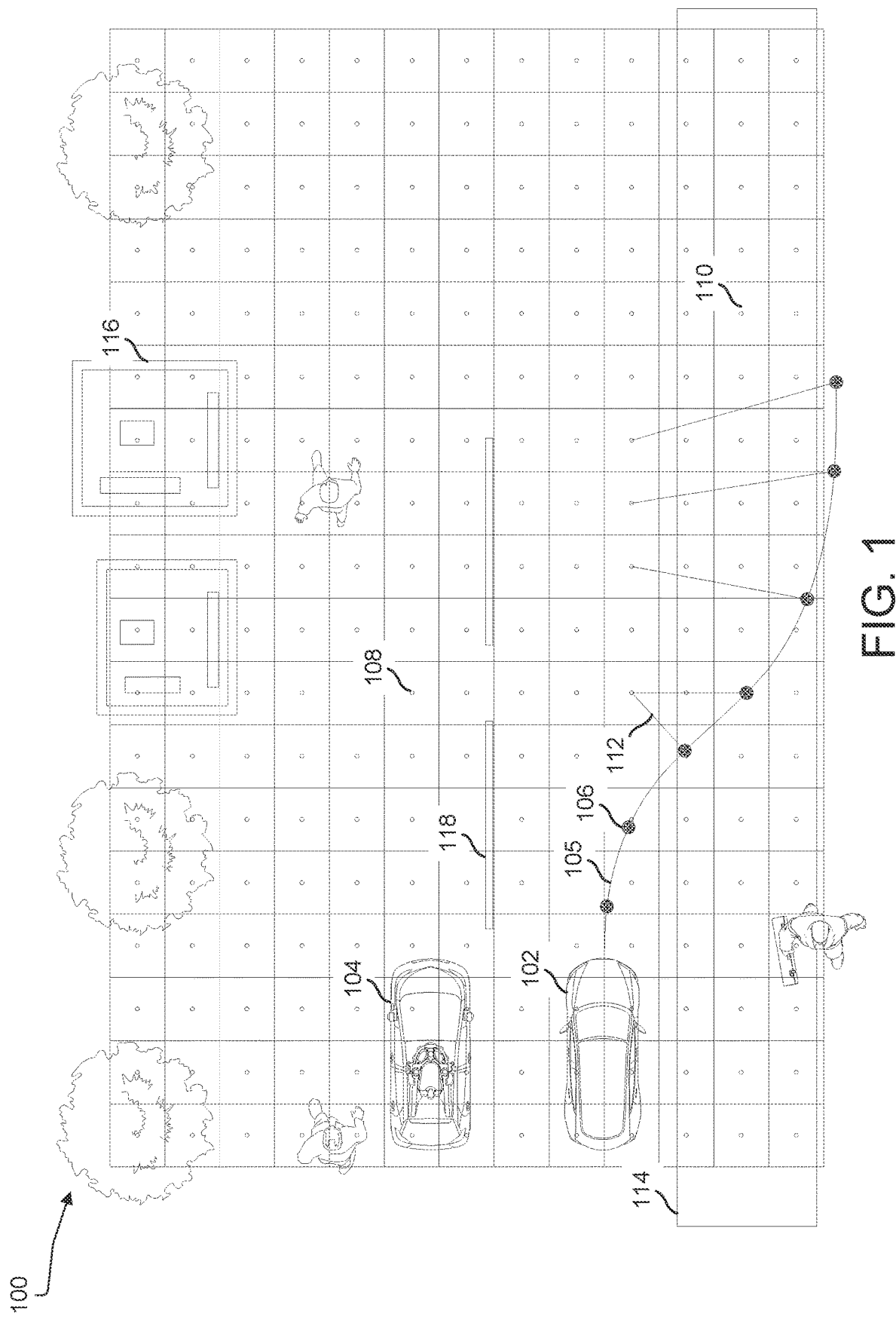
FIG. 1 illustrates an example system for implementing AV prediction layer training, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. Automation technology enables the AVs to drive on roadways and to perceive the surrounding environment accurately and quickly, including obstacles, signs, and traffic lights. In some cases, AVs can be used to pick up passengers and drive the passengers to selected destinations.

As discussed above, autonomous vehicles are designed to navigate autonomously in an environment without human input or intervention. In order to successfully navigate an environment autonomously, an AV may need to make predictions about other vehicles on the road. In other words, there may be other vehicles in the environment that have a trajectory that may potentially impact the AV. For example, there may be another vehicle with a trajectory indicating a lane change towards the same lane that the AV is changing to. In this example, the AV may need to make accurate predictions of the other vehicle's trajectory to avoid a potential collision. In another example, an AV may predict the trajectory of another vehicle that is headed towards a curb or sidewalk to continue a trajectory along the sidewalk which is a non-drivable area. However, the other vehicle may be headed towards the curb or sidewalk to parallel park, so in this example the AV is making an inaccurate prediction. In another example, an AV may inaccurately predict another vehicle as maintaining a trajectory between lanes, or on the road lines (also lane markers) which is also a non-drivable area. Those skilled in the art will appreciate additional examples of AV predictions of other vehicles with incorrect trajectories, such as trajectories on non-drivable areas. Autonomous vehicles may have stored road data (which will be discussed in further detail in FIG. 1 below) which includes stored information such as sensor and map data from previous scenarios. In other words, the AV can have stored information of trajectories of other vehicles from one or more real-world environments. In addition, the AV can maintain one or more pre-existing maps of environments that indicate which portions of the map are considered drivable areas and non-drivable areas. The repository of road data can include data representing different scenarios in which the AV incorrectly predicts the trajectories of other vehicles on the road. In addition, error functions can be developed which indicate error or performance metrics (e.g., the difference between the predicted trajectory of another vehicle compared to the actual trajectory) of the AV's prediction layer (e.g., prediction stack 616 in FIG. 6) which can predict trajectories of other objects.

Aspects of the disclosed invention provide solutions for training the prediction layer of an autonomous vehicle using machine learning (ML). For example, as discussed above, the prediction layer of the AV may predict trajectories (e.g., using machine learning algorithms) of other objects or vehicles in the surrounding environment (e.g., within the environment that can be perceived by the sensors on the AV). The AV may compare the road data which includes the actual trajectory of another vehicle with the predicted trajectory (e.g., as predicted by the prediction layer). The deviation or distance between the actual trajectory and the predicted trajectory of another vehicle can be used to calculate an error or distance metric. As a result, this calculated distance metric can be used to train the machine learning algorithms of the prediction layer of the AV. That is, the distance metric can be included as part of a loss function that is used to train a prediction layer of the AV software stack. By including the distance metric as part of the loss function, the prediction layer's predicted trajectories of other vehicles (post-training) can be closer to the actual trajectories (e.g., the distance between the predicted trajectories and actual trajectories decreases).

Figure 6:
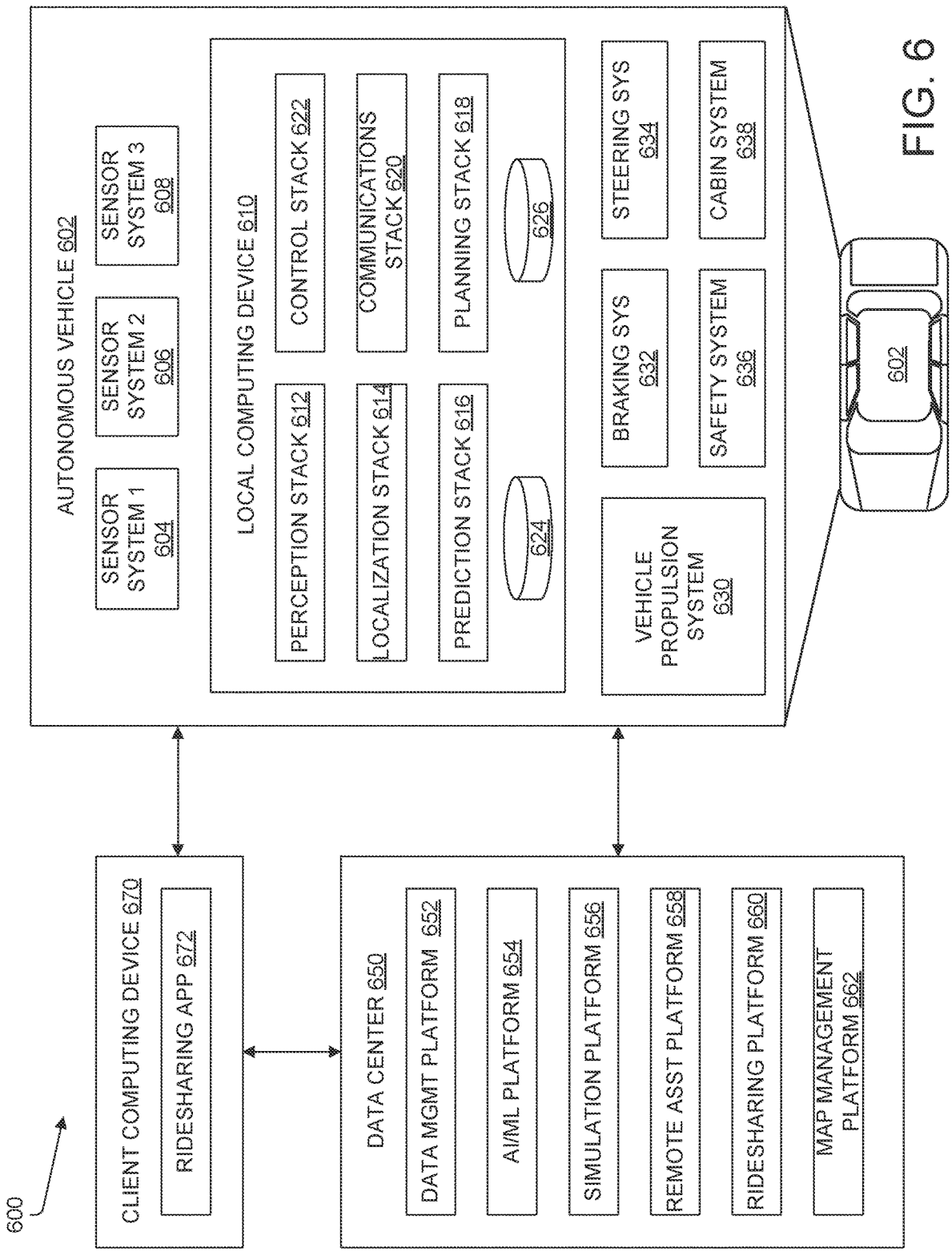
FIG. 6 illustrates an example system environment that can be used to facilitate autonomous vehicle (AV) dispatch and operations, according to some aspects of the disclosed technology.

FIG. 1 illustrates an example of a training scenario 100 in which an autonomous vehicle prediction layer training process may be implemented. Training scenario 100 includes AV 104 and a target vehicle 102, for which AV 102 can be configured to compute various predicted trajectories (e.g., predicted trajectory 105). In some aspects, training scenario 100 can represent one example of one or more environments (e.g., real-world environments) previously captured by AV 104 which may be archived or stored data within a local computing device within AV 104 (e.g., stored within local computing device 610 as illustrated in FIG. 6). The previously captured data can be road data which may include all the sensor data (e.g., LiDAR, RADAR, ultrasonic, IMU, GNSS as illustrated by sensor systems 604, 606 and 608 in FIG. 6) and the pose (e.g., pitch, roll, yaw) of AV 104. The road data may include multiple predictions of the trajectories of different target vehicles in multiple real-world environments. In addition, AV 104 may include stored pre-existing map data for one or more environments that includes information indicating which areas of the environment are drivable and non-drivable. For example, training scenario 100 is an illustration of one environment that may be encountered by AV 104 for which AV 104 has stored pre-existing map data for, specifically, which portions of the environment are drivable or non-drivable.

Map data for the environment may be divided into cells (e.g., predefined map areas) as illustrated in FIG. 1, where each cell can represent an area or region of the map, and that can be associated with metadata labels or tags indicating if the corresponding region is drivable or non-drivable by AV 104. Non-drivable cells 110 can be located in non-drivable areas such as sidewalk 114 where AV 104 is not intended to drive (e.g., an area intended for pedestrian use). In another example, a non-drivable area for AV 104 can be a road line 118 which is intended for separating drivable regions on the road. The map data may also include objects or obstructions 116 such as a building or tree which are also located in non-drivable cells 110. Conversely, map data can also include drivable cells 108 which are in areas drivable by AV 104 (e.g., roadways between road lines 118). Those skilled in the art will appreciate additional examples of drivable and non-drivable areas.

The AV 104 can also detect (e.g., via perception stack 612 as illustrated in FIG. 6) other vehicles on the road such as target vehicle 102. As discussed above, AV 104 may need to accurately predict the trajectory of target vehicle 102. This predicted trajectory 105 is illustrated as a path line or predicted navigation path that represents the trajectory that AV 104 has predicted for target vehicle 102. In other words, the prediction layer (e.g., prediction stack 616 as illustrated in FIG. 6) of AV 104 is configured to predict a path that target vehicle 102 is going to take at future time intervals. The predicted trajectory 105 may include one or more waypoints 106 that can occur at discrete time intervals. For example, the time between each consecutive waypoint 106 can be a linear distribution, e.g., separated by 0.25 second, 0.5 second, or 0.75 second time intervals, or the like. In other implementations, waypoints 106 may be non-linearly distributed (e.g., the time between each consecutive waypoint 106 can vary). Waypoints 106 may be points in time during which AV 104 is predicting the location of target vehicle 102. The prediction layer for AV 104 may include machine learning algorithms (e.g., via deep learning neural network 700 as discussed in FIG. 7 below) which can be trained to predict the trajectory of target vehicle 102 (i.e., the path illustrated as predicted trajectory 105). For example, the machine learning algorithms may use error functions to train or improve the prediction capability of AV 104.

As illustrated in FIG. 1, an error function may be based on the distance 112 from each waypoint 106 (that occurs in non-drivable cells 110), to the corresponding nearest drivable cell 108. Training scenario 100 illustrates the first two waypoints 106 of predicted trajectory 105 as occurring in drivable cells 108. Training scenario 100 illustrates the next five waypoints 106 as occurring in non-drivable cells 110 (e.g., since the non-drivable cells 110 are illustrated as within sidewalk 114). For each of these five waypoints 106, an error function may be based on the distance 112 between each of these five waypoints 106 and their corresponding nearest drivable cell 108 (e.g., the distance to the centroids of drivable cell 108). In addition, the error function may be represented as a sum of distances 112 to determine a distance metric. The distance metric may represent how well AV 104 predicts the trajectory of target vehicle 102 compared to the actual trajectory of target vehicle 102 (not illustrated). As such, the machine learning algorithms of the prediction layer of AV 104 may use the distance metric to train the prediction of target vehicle 102 (e.g., the predicted trajectory of target vehicle 105 is more representative of the actual or real trajectory of target vehicle 102). In other words, the distance metric (e.g., the sum of distances 112) may be inversely proportional to the accuracy of predicted trajectory 105 (e.g., a small distance metric may represent a more accurate prediction of target vehicle 102 compared to a larger distance metric).

Depending on the desired implementation, different distance metrics may be used. For example, the distance metric may be based on a Mahalanobis distance in multivariate space (e.g., rather than a Euclidean space). Additional examples of error functions may include, but are not limited to, a measure of kinematic infeasibility of the predicted trajectories such as acceleration or turn rate exceeding set thresholds, a measure of the number of predicted collisions, and mismatched kinematics (e.g., velocity, acceleration) between the ground truth and predictions. In some aspects, the error functions can be formulated in such a way that they are differentiable and subject to optimization by gradient-based methods.

Figure 2:
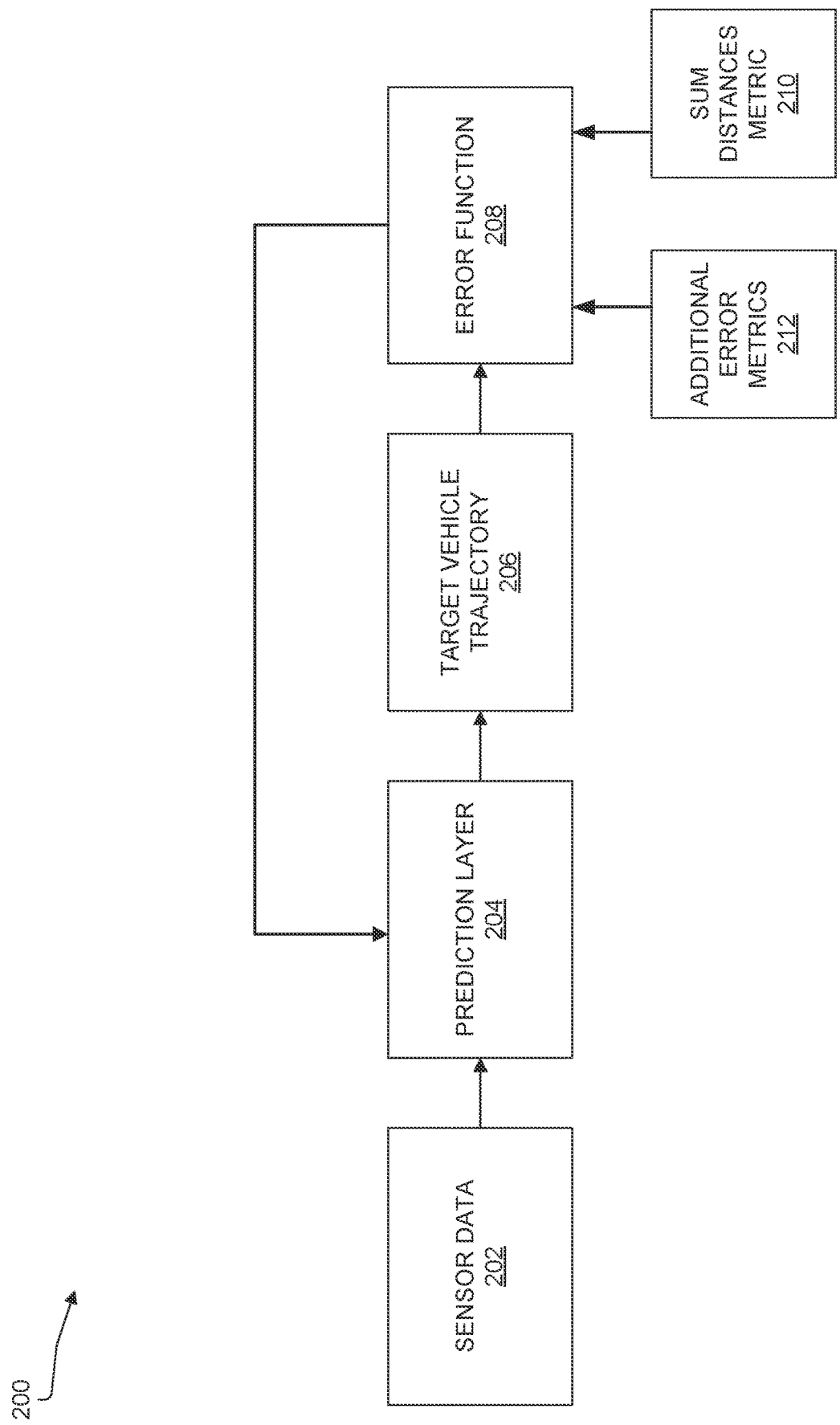
FIG. 2 illustrates another example system for implementing AV prediction layer training, according to some examples of the present disclosure.

FIG. 2 illustrates another example of a training scenario 200 in which an autonomous vehicle prediction layer training process can be implemented. Training scenario 200 includes sensor data 202, prediction layer 204, target vehicle trajectory 206, error function 208, additional error metrics 212, and sum distances metric 210. Sensor data 202 may include a repository of sensor data (e.g., road data) captured by an AV in addition to pre-existing map data for one or more real-world environments. The prediction layer 204 (e.g., prediction stack 616 as illustrated in FIG. 6) can receive sensor data 202 from one or more real-world environments. Prediction layer 204 may include machine learning algorithms which can be trained using sensor data 202. As such, prediction layer 204 can be trained to predict the trajectory of a target vehicle as illustrated by target vehicle trajectory 206. The target vehicle trajectory 206 may include a series of waypoints at discrete time intervals that represent the predicted location of a target vehicle at various points in time.

Error function 208 can receive the target vehicle trajectory 206 and compute one or more error metrics that can be used to train prediction layer 204. As illustrated in FIG. 2, the output of error function 208 is inputted to prediction layer 204. The error function 208 may compute error metrics using additional error metrics 212 (e.g., kinematic infeasibility, number of collisions, and kinematic mismatch) and sum distances metric 210. The sum distances metric 210 can be a process that is configured to calculate a distance metric by comparing the target vehicle trajectory 206 with the actual trajectory of the target vehicle. In other words, sum distances metric 210 can determine the difference between the target vehicle trajectory 206 (as predicted by prediction layer 204) with the real-world trajectory of the target vehicle. The sum distances metric 210 and additional error metrics 212 can be used by error function 208 to compute error metrics which may be used to train prediction layer 204 (e.g., train machine learning algorithms within prediction layer 204). As a result, the predictive capabilities (accuracy) of prediction layer 204 can be improved over time, e.g., with exposure to new trajectory examples.

Figure 3:
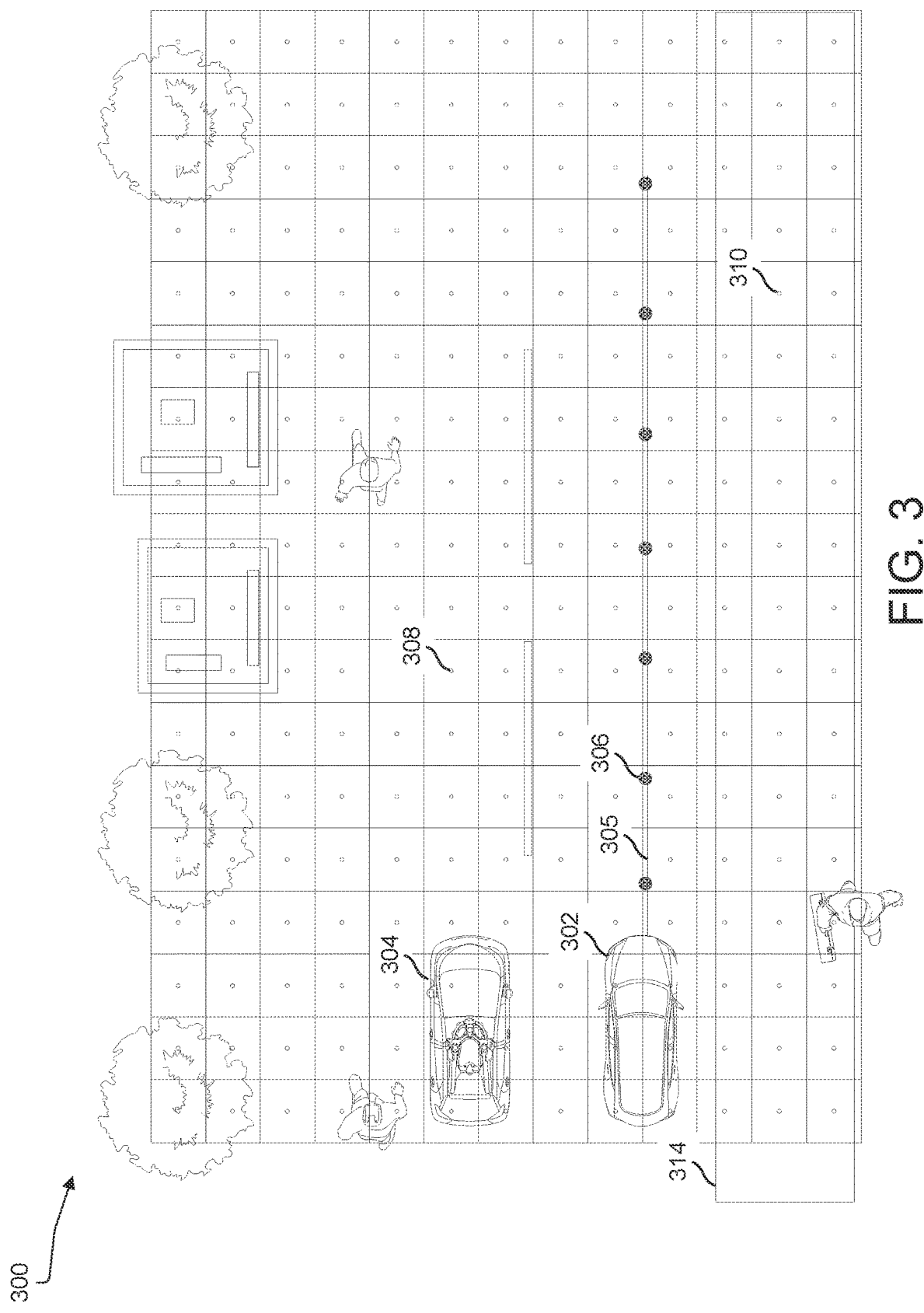
FIG. 3 illustrates an example system for implementing a trained AV prediction layer, according to some examples of the present disclosure.

FIG. 3 illustrates an example of an on-line scenario 300 in which a (trained) prediction layer process may be implemented. On-line scenario 300 includes AV 304, target vehicle 302, predicted trajectory of target vehicle 305, one or more waypoints 306, sidewalk 314, one or more non-drivable cells 310, and one or more drivable cells 308. In some aspects, on-line scenario 300 can represent one or more environments (e.g., real-world environments) in which AV 304 is navigating autonomously. In addition, AV 304 may represent AV 104 after prediction layer training. In other words, the prediction layer (e.g., prediction stack 616 as illustrated in FIG. 6) of AV 304 has gone through training (e.g., the machine learning algorithms have been trained) based on the distance metric calculations performed in FIG. 1. The prediction layer training can include road data from one or more real-world environments including one or more predicted trajectories of target vehicles. The prediction layer of AV 304 is predicting the path that target vehicle 302 is going to take (e.g., at future time intervals). The predicted trajectory of target vehicle 305 may include one or more consecutive waypoints 306 as discussed above in FIG. 1.

Since AV 304 has gone through prediction layer training, the predicted trajectory of target vehicle 305 is shown as navigating on drivable cells 308. In other words, unlike the predicted trajectory of target vehicle 105 as illustrated in FIG. 1, target vehicle 302 has a trajectory that is predicted by AV 304 to stay within drivable cells 308. As illustrated in FIG. 3, target vehicle 302 is no longer navigating on sidewalk 314 containing non-drivable cells 310. In addition, the predicted trajectory of target vehicle 305 is more representative of the actual or real trajectory of target vehicle 302. As illustrated in FIG. 3, the calculated distance metric (e.g., the sum of distances not shown in FIG. 3) is lower in comparison to the distance metric as illustrated in FIG. 1. Consequently, AV 304 has a more accurate prediction of target vehicle 302 compared to the prediction AV 104 has of target vehicle 102.

Figure 4:
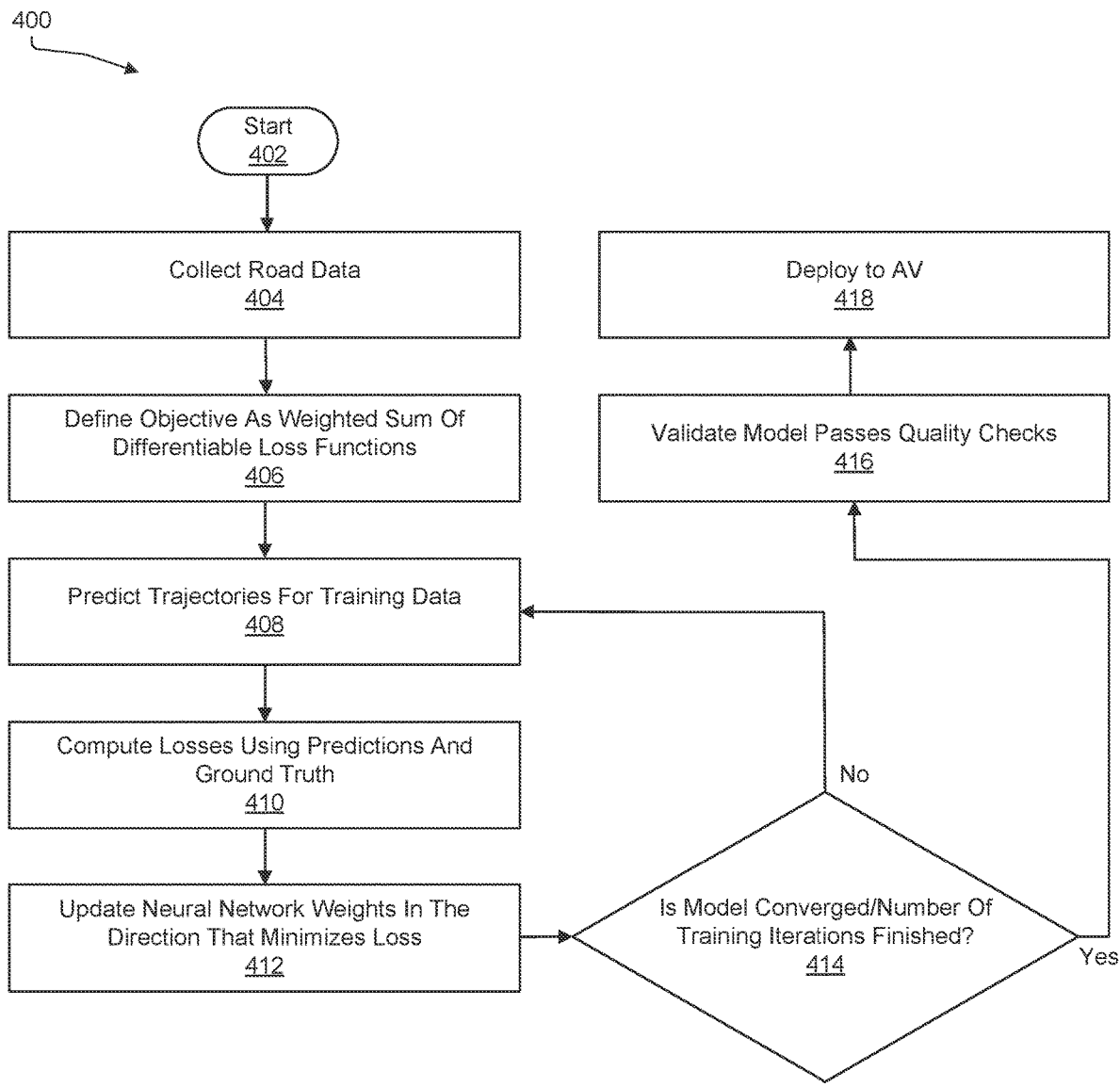
FIG. 4 illustrates an example of a process for implementing AV prediction layer training, according to some examples of the present disclosure.

FIG. 4 illustrates an example of a process 400 for implementing AV prediction layer training. In some examples, the process 400 may start at step 402 to begin training the prediction layer of an autonomous vehicle. At step 404, a computer system may collect road data for one or more real-world environments where an autonomous vehicle has made one or more trajectory predictions for one or more target vehicles (or other objects) encountered in the scene. The road data can contain one or more examples of target vehicles captured in real-world environments. In some cases, the computer system may be the local computing device within an autonomous vehicle or an external computing device (e.g., an external computing device with equivalent software and hardware of an AV).

At step 406, the computer system can define a weighted sum of differentiable loss functions. In some cases, the loss function may use a distance metric (e.g., sum of distances 112 as illustrated in FIG. 1) to train a prediction layer of the AV software stack. In other words, the distance metric can be a weighted sum which can be calculated by summing the distances between the one or more waypoints of the predicted trajectory of the target vehicle to the nearest corresponding drivable cell. As discussed above, by including the distance metric as part of the loss function, the prediction layer's predicted trajectories of other vehicles (post-training) may be closer to the actual trajectories.

At step 408, the computer system can predict the trajectory of a target vehicle (e.g., trajectory 105 of target vehicle 102 as illustrated in FIG. 1). Next, process 400 continues to step 410 where the computer system can compute losses using the prediction (from step 408) and ground truth data (e.g., the actual trajectory of the target vehicle). In some examples, the computer system may compute a loss function that includes a distance metric based on differences between the actual trajectory of the target vehicle (e.g., based on the ground truth data) and the predicted trajectory (e.g., from step 408).

At step 412, the process 400 includes updating the neural network weights in the direction that minimizes loss. For example, the neural network (e.g., neural network 700 as discussed in FIG. 7 below) training may consider the loss function and multiple others, (e.g., multi-objective training), and iteratively modify predictions (e.g., predicted trajectories) in a way that minimizes errors until the method converges or a given number of iterations is reached. In other words, the errors may represent the difference between the predicted trajectories and the actual trajectories (e.g., based on ground truth data).

Next, at step 414, the process includes determining whether the model converged or whether the number of training iterations are finished. In other words, a determination may be made whether enough iterations have been performed for training the neural network such that the predicted trajectories (e.g., as predicted in step 408) are representative of ground truth data. If a determination is made that the model has not converged, the process 400 returns to step 408 to continue the iteratively modifying predictions until the method converges. Conversely, if a determination is made that the model has converged, the process 400 can continue to step 416.

At step 416, process 400 may validate the model and perform quality checks. Next, process 400 continues to step 418 to deploy the AV. For example, the deployed AV (e.g., the AV after the process 400 of prediction layer training) may be able to make more accurate predictions (e.g., based on the new loss function as defined in step 406) of the target vehicle compared to the AV before the training process 400. In other words, the predictions of the target vehicle may be more representative of the actual trajectory (e.g., based on ground truth data) of the target vehicle.

Figure 5:
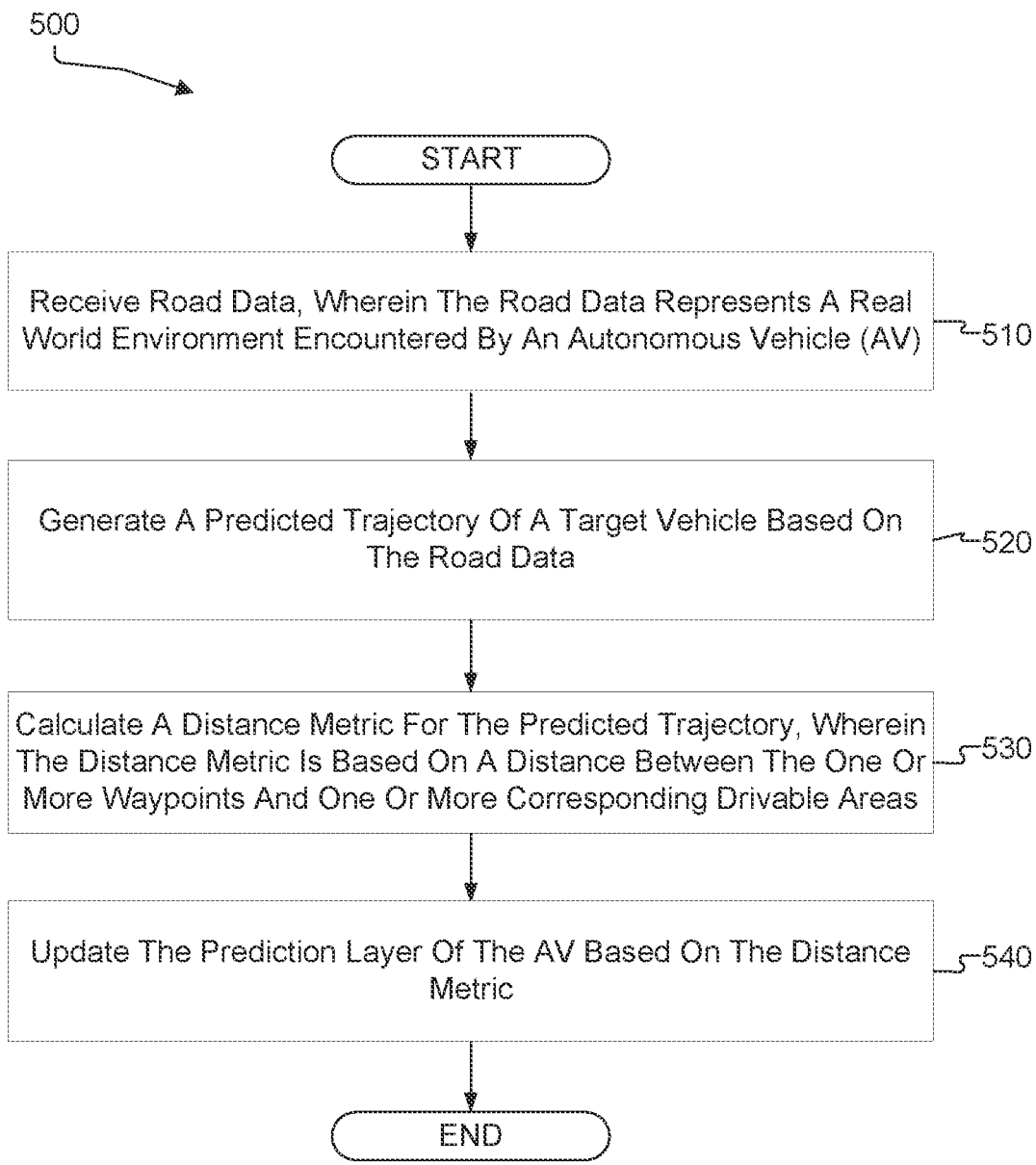
FIG. 5 illustrates another example of a process for implementing AV prediction layer training, according to some examples of the present disclosure.

FIG. 5 illustrates another example of a process 500 for implementing AV prediction layer training. At block 510, process 500 includes receiving road data, wherein the road data represents a real-world environment encountered by an autonomous vehicle. For example, AV 104 can receive road data representative of one or more real-world environments as illustrated in training scenario 100. By way of example, road data can include various types of sensor data that have been collected by physically mounted AV sensors (e.g., during the course of AV navigation through an environment).

At block 520, process 500 includes generating, using a prediction layer of the AV, a predicted trajectory of a target vehicle, wherein the predicted trajectory comprises one or more waypoints and wherein the predicted trajectory is based on the road data. For example, prediction stack 616 of AV 104 can predict the trajectory 105 of target vehicle 102. In addition, the predicted trajectory 105 of target vehicle 102 may comprise one or more waypoints (e.g., waypoints 106). The waypoints can represent future predicted locations of the target vehicle at discrete time intervals. As discussed above, the time intervals may be predefined, such that the waypoints occur in 0.25 second, or 0.5 second periodic intervals. It is understood that other intervals may be used, without departing from the scope of the disclosed technology. In some approaches, the predicted trajectory 105 can be stored as road-data.

At block 530, process 500 includes calculating a distance metric for the predicted trajectory, wherein the distance metric is based on a distance between the one or more waypoints and one or more (closest) corresponding drivable areas. For example, referring to the example of FIG. 1, a distance metric can be calculated for the predicted trajectory 105 which may be based on a distance 112 between the one or more waypoints 106 and corresponding drivable areas (e.g., drivable cells 108). Depending on the desired implementation, the distance metric for the predicted trajectory 105 may be computed using one or more compute nodes that are physically collocated with the AV, and/or that reside at a remote location. For example, all (or a portion of) the steps of process 500 may be performed using one or more cloud computing resources, or the like.

At block 540, process 500 includes updating the prediction layer of the AV based on the distance metric. For example, prediction layer (e.g., prediction stack 616) can include machine learning algorithms (e.g., via deep learning neural network 700) which can be updated (trained) using the distance metric calculated in block 530.

In some examples, the prediction layer comprises a deep learning neural network. For example, prediction layer 204 may include a deep learning neural network 700. In some examples, the one or more corresponding drivable areas are nearest drivable areas to the one or more waypoints. For example, the one or more corresponding drivable areas can be drivable cells that are closest in distance to each respective waypoint. In some examples, the distance metric can be based on a sum of one or more distances between the one or more waypoints and the one or more corresponding drivable areas. For example, the distance metric can be the sum of distances between each waypoint and corresponding drivable cell 108. In some examples, the waypoints occur at discrete time intervals. For example, the waypoints may be separated by a discrete time value (e.g., occurring every half-second, one second, etc.). In some examples, the road data comprises at least one of light detection and ranging (LiDAR) data, radio detection and ranging (RADAR) data, ultrasonic data, Inertial Measurement Unit (IMU) data, GNSS data, map data, pose data, or a combination thereof. For example, referring to FIG. 2, sensor data 202 can include road data. In some examples, each of the one or more corresponding drivable areas is identified on a pre-existing map corresponding with an environment associated with the AV. For example, local computing device 610 can include stored pre-existing map data for one or more environments (e.g., real-world environments) encountered by an AV.

FIG. 6 is a diagram illustrating an example autonomous vehicle (AV) environment 600, according to some examples of the present disclosure. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 602 can navigate roadways without a human driver based on sensor signals generated by multiple sensor systems 604, 606, and 608. The sensor systems 604-608 can include one or more types of sensors and can be arranged about the AV 602. For instance, the sensor systems 604-608 can include Inertial Measurement Units (IMUs), cameras (e.g., still image cameras, video cameras, etc.), light sensors (e.g., LiDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LiDAR system, and the sensor system 608 can be a RADAR system. Other examples may include any other number and type of sensors.

The AV 602 can also include several mechanical systems that can be used to maneuver or operate the AV 602. For instance, the mechanical systems can include a vehicle propulsion system 630, a braking system 632, a steering system 634, a safety system 636, and a cabin system 638, among other systems. The vehicle propulsion system 630 can include an electric motor, an internal combustion engine, or both. The braking system 632 can include an engine brake, brake pads, actuators, and/or any other suitable componentry configured to assist in decelerating the AV 602. The steering system 634 can include suitable componentry configured to control the direction of movement of the AV 602 during navigation. The safety system 636 can include lights and signal indicators, a parking brake, airbags, and so forth. The cabin system 638 can include cabin temperature control systems, in-cabin entertainment systems, and so forth. In some examples, the AV 602 might not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

The AV 602 can include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a localization stack 614, a prediction stack 616, a planning stack 618, a communications stack 620, a control stack 622, an AV operational database 624, and an HD geospatial database 626, among other stacks and systems.

The perception stack 612 can enable the AV 602 to "see" (e.g., via cameras, LiDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the localization stack 614, the HD geospatial database 626, other components of the AV, and other data sources (e.g., the data center 650, the client computing device 670, third party data sources, etc.). The perception stack 612 can detect and classify objects and determine their current locations, speeds, directions, and the like. In addition, the perception stack 612 can determine the free space around the AV 602 (e.g., to maintain a safe distance from other objects, change lanes, park the AV, etc.). The perception stack 612 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 614 can determine the AV's position and orientation (pose) using different methods from multiple systems (e.g., GPS, IMUs, cameras, LiDAR, RADAR, ultrasonic sensors, the HD geospatial database 626, etc.). For example, in some cases, the AV 602 can compare sensor data captured in real-time by the sensor systems 604-608 to data in the HD geospatial database 626 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LiDAR). If the mapping and localization information from one system is unavailable, the AV 602 can use mapping and localization information from a redundant system and/or from remote data sources.

The prediction stack 616 can receive information from the localization stack 614 and objects identified by the perception stack 612 and predict a future path for the objects. In some examples, the prediction stack 616 can output several likely paths that an object is predicted to take along with a probability associated with each path. For each predicted path, the prediction stack 616 can also output a range of points along the path corresponding to a predicted location of the object along the path at future time intervals along with an expected error value for each of the points that indicates a probabilistic deviation from that point.

The planning stack 618 can determine how to maneuver or operate the AV 602 safely and efficiently in its environment. For example, the planning stack 618 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 602 from one point to another and outputs from the perception stack 612, localization stack 614, and prediction stack 616. The planning stack 618 can determine multiple sets of one or more mechanical operations that the AV 602 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 618 can select from multiple backup plans to carry out. For example, while preparing to change lanes to turn right at an intersection, another vehicle may aggressively cut into the destination lane, making the lane change unsafe. The planning stack 618 could have already determined an alternative plan for such an event. Upon its occurrence, it could help direct the AV 602 to go around the block instead of blocking a current lane while waiting for an opening to change lanes.

The control stack 622 can manage the operation of the vehicle propulsion system 630, the braking system 632, the steering system 634, the safety system 636, and the cabin system 638. The control stack 622 can receive sensor signals from the sensor systems 604-608 as well as communicate with other stacks or components of the local computing device 610 or a remote system (e.g., the data center 650) to effectuate operation of the AV 602. For example, the control stack 622 can implement the final path or actions from the multiple paths or actions provided by the planning stack 618. This can involve turning the routes and decisions from the planning stack 618 into commands for the actuators that control the AV's steering, throttle, brake, and drive unit.

The communications stack 620 can transmit and receive signals between the various stacks and other components of the AV 602 and between the AV 602, the data center 650, the client computing device 670, and other remote systems. The communications stack 620 can enable the local computing device 610 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 620 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 626 can store HD maps and related data of the streets upon which the AV 602 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 624 can store raw AV data generated by the sensor systems 604-608, stacks 612-622, and other components of the AV 602 and/or data received by the AV 602 from remote systems (e.g., the data center 650, the client computing device 670, etc.). In some examples, the raw AV data can include HD LiDAR point cloud data, image data, RADAR data, GPS data, and other sensor data that the data center 650 can use for creating or updating AV geospatial data or for creating simulations of situations encountered by AV 602 for future testing or training of various machine learning algorithms that are incorporated in the local computing device 610.

The data center 650 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes a data management platform 652, an Artificial Intelligence/Machine Learning (AI/ML) platform 654, a simulation platform 656, a remote assistance platform 658, and a ridesharing platform 660, and a map management platform 662, among other systems.

The data management platform 652 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from a cartography platform (e.g., map management platform 662); modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 672. The client computing device 670 can be a customer's mobile computing device or a computing device integrated with the AV 602 (e.g., the local computing device 610). The ridesharing platform 6160 can receive requests to pick up or drop off from the ridesharing application 6172 and dispatch the AV 6102 for the trip.

Map management platform 662 can provide a set of tools for the manipulation and management of geographic and spatial (geospatial) and related attribute data. The data management platform 652 can receive LiDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

While the autonomous vehicle 602, the local computing device 610, and the autonomous vehicle environment 600 are shown to include certain systems and components, one of ordinary skill will appreciate that the autonomous vehicle 602, the local computing device 610, and/or the autonomous vehicle environment 600 can include more or fewer systems and/or components than those shown in FIG. 6. For example, the autonomous vehicle 602 can include other services than those shown in FIG. 6 and the local computing device 610 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 6. An illustrative example of a computing device and hardware components that can be implemented with the local computing device 610 is described below with respect to FIG. 8.

Figure 7:
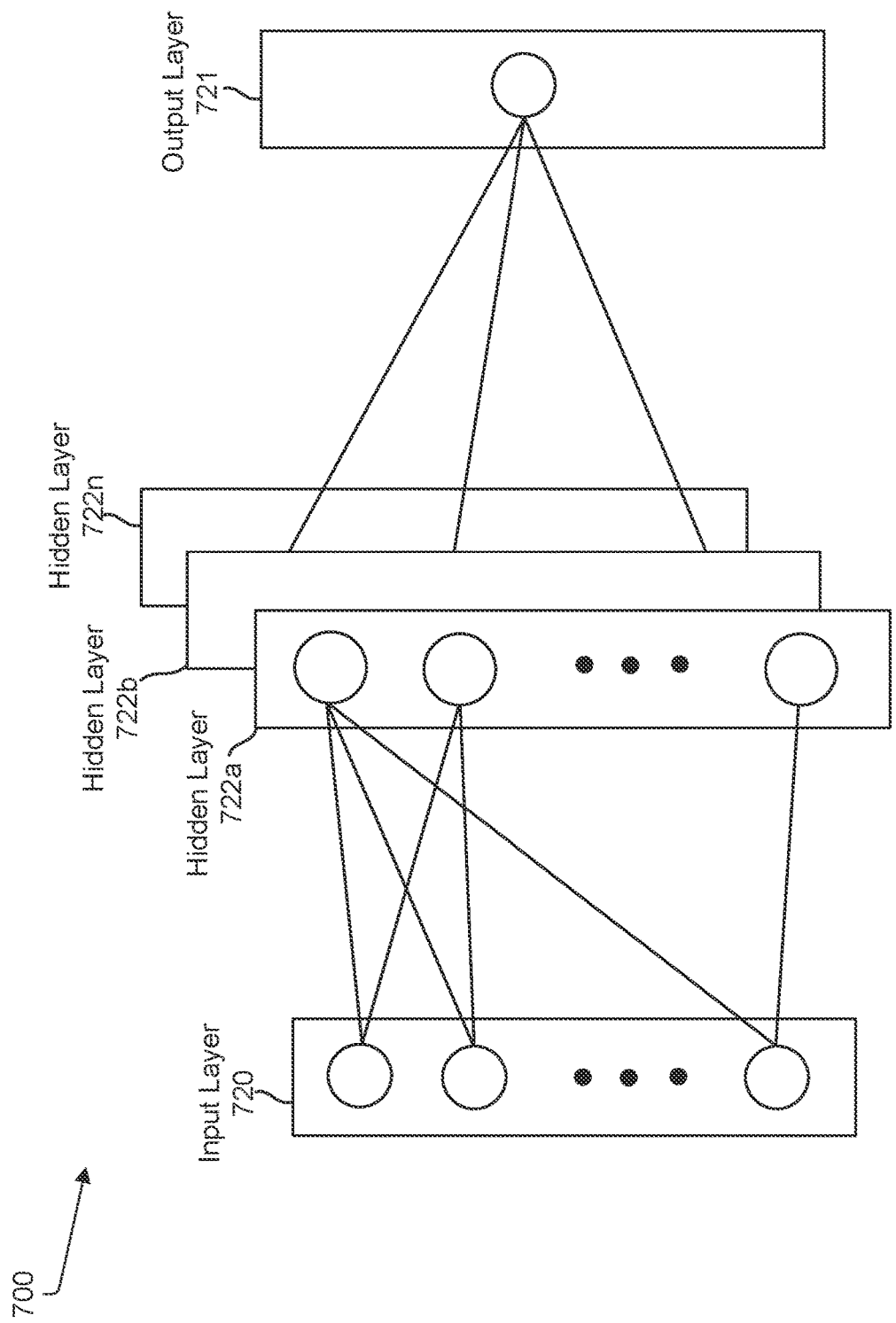
FIG. 7 illustrates an example of a deep learning neural network that can be configured to generate trajectory or path predictions for a target vehicle, according to some aspects of the disclosed technology.

In FIG. 7, the disclosure now turns to a further discussion of models that can be used through the environments and techniques described herein. FIG. 7 is an example of a deep learning neural network 700 that can be used to implement all or a portion of the systems and techniques described herein (e.g., neural network 700 can be used to implement a perception module (or perception system) as discussed above). In another example, neural network 700 may contain machine learning algorithms and can be included in the prediction layer (e.g., prediction stack 616) of an autonomous vehicle. The neural network 700 may be trained using road data to determine a predicted trajectory of a target vehicle.

In some examples, an input layer 720 can be configured to receive sensor data and/or data relating to an environment surrounding an AV, such as one or more outputs from a perception layer of the AV software stack. Neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. Neural network 700 further includes an output layer 721 that provides an output resulting from the processing performed by the hidden layers 722a, 722b, through 722n.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function (including a distance metric, as discussed above), a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(½(target - output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
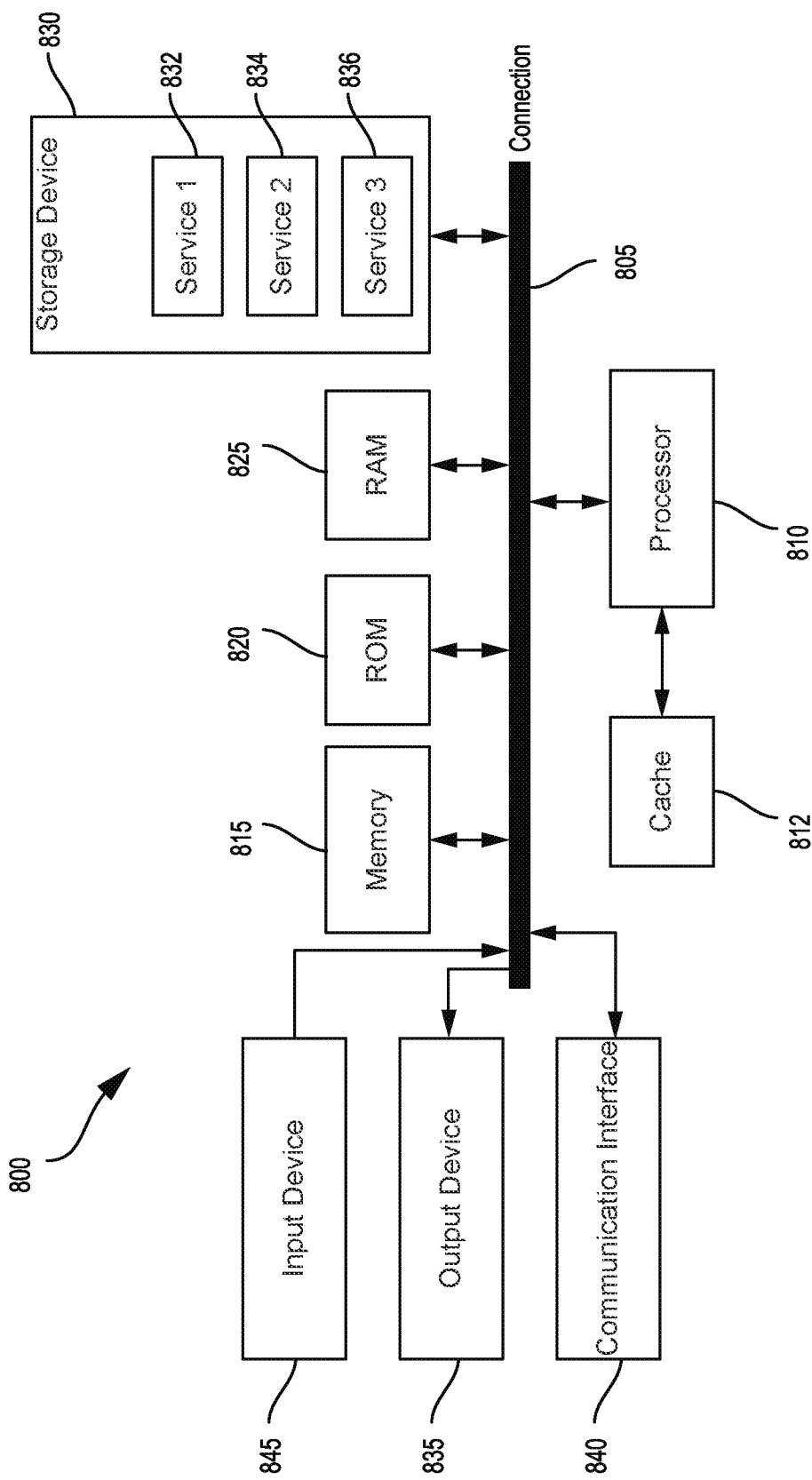
FIG. 8 illustrates an example processor-based system with which some aspects of the subject technology can be implemented.

FIG. 8 illustrates an example processor-based system 800 with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Illustrative examples of the disclosure include:

Aspect 1. A system comprising: at least one memory; and at least one processor coupled to the at least one memory, the at least one processor configured to: receive road data, wherein the road data represents a real-world environment encountered by an autonomous vehicle (AV); generate, using a prediction layer of the AV, a predicted trajectory of a target vehicle, wherein the predicted trajectory comprises one or more waypoints and wherein the predicted trajectory is based on the road data; calculate a distance metric for the predicted trajectory, wherein the distance metric is based on a distance between the one or more waypoints and one or more corresponding drivable areas; and update the prediction layer of the AV based on the distance metric.

Aspect 2. The system of Aspect 1, wherein the prediction layer comprises a deep learning neural network.

Aspect 3. The system of any of Aspects 1-2, wherein the one or more corresponding drivable areas are nearest drivable areas to the one or more waypoints.

Aspect 4. The system of any of Aspects 1-3, wherein the distance metric comprises a sum of one or more distances between the one or more waypoints and the one or more corresponding drivable areas.

Aspect 5. The system of any of Aspects 1-4, wherein the one or more waypoints occur at discrete time intervals.

Aspect 6. The system of any of Aspects 1-5, wherein the road data comprises at least one of light detection and ranging (LiDAR) data, radio detection and ranging (RADAR) data, ultrasonic data, Inertial Measurement Unit (IMU) data, GNSS data, map data, pose data, or a combination thereof.

Aspect 7. The system of any of Aspects 1-6, wherein each of the one or more corresponding drivable areas is identified on a pre-existing map corresponding with an environment associated with the AV.

Aspect 8. A method comprising: receiving road data, wherein the road data represents a real-world environment encountered by an autonomous vehicle (AV); generating, using a prediction layer of the AV, a predicted trajectory of a target vehicle, wherein the predicted trajectory comprises one or more waypoints and wherein the predicted trajectory is based on the road data; calculating a distance metric for the predicted trajectory, wherein the distance metric is based on a distance between the one or more waypoints and one or more corresponding drivable areas; and updating the prediction layer of the AV based on the distance metric.

Aspect 9. The method of Aspect 8, wherein the prediction layer comprises a deep learning neural network.

Aspect 10. The method of any of Aspects 8-9, wherein the one or more corresponding drivable areas are nearest drivable areas to the one or more waypoints.

Aspect 11. The method of any of Aspects 8-10, wherein the distance metric comprises a sum of one or more distances between the one or more waypoints and the one or more corresponding drivable areas.

Aspect 12. The method of any of Aspects 8-11, wherein the one or more waypoints occur at discrete time intervals.

Aspect 13. The method of any of Aspects 8-12, wherein the road data comprises at least one of light detection and ranging (LiDAR) data, radio detection and ranging (RADAR) data, ultrasonic data, Inertial Measurement Unit (IMU) data, GNSS data, map data, pose data, or a combination thereof.

Aspect 14. The method of any of Aspects 8-13, wherein each of the one or more corresponding drivable areas is identified on a pre-existing map corresponding with an environment associated with the AV.

Aspect 15. A non-transitory computer-readable storage medium comprising at least one instruction for causing a computer or processor to: receive road data, wherein the road data represents a real-world environment encountered by an autonomous vehicle (AV); generate, using a prediction layer of the AV, a predicted trajectory of a target vehicle, wherein the predicted trajectory comprises one or more waypoints and wherein the predicted trajectory is based on the road data; calculate a distance metric for the predicted trajectory, wherein the distance metric is based on a distance between the one or more waypoints and one or more corresponding drivable areas; and update the prediction layer of the AV based on the distance metric.

Aspect 16. The non-transitory computer-readable storage medium of Aspect 15, wherein the prediction layer comprises a deep learning neural network.

Aspect 17. The non-transitory computer-readable storage medium of any of Aspects 15-16, wherein the one or more corresponding drivable areas are nearest drivable areas to the one or more waypoints.

Aspect 18. The non-transitory computer-readable storage medium of any of Aspects 15-17, wherein the distance metric comprises a sum of one or more distances between the one or more waypoints and the one or more corresponding drivable areas.

Aspect 19. The non-transitory computer-readable storage medium of any of Aspects 15-18, wherein the one or more waypoints occur at discrete time intervals.

Aspect 20. The non-transitory computer-readable storage medium of any of Aspects 15-19, wherein the road data comprises at least one of light detection and ranging (LiDAR) data, radio detection and ranging (RADAR) data, ultrasonic data, Inertial Measurement Unit (IMU) data, GNSS data, map data, pose data, or a combination thereof.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A system comprising:
   at least one memory; and
   at least one processor coupled to the at least one memory, the at least one processor configured to:
   receive road data, wherein the road data represents a real-world environment encountered by an autonomous vehicle (AV);
   generate, using a prediction layer of the AV, a predicted trajectory of a target vehicle, wherein the predicted trajectory comprises one or more waypoints and wherein the predicted trajectory is based on the road data;

calculate a distance metric for the predicted trajectory, wherein the distance metric is based on a distance between the one or more waypoints and one or more corresponding drivable areas, wherein the one or more corresponding drivable areas are nearest drivable areas to the one or more waypoints;

update the prediction layer of the AV based on the distance metric; and control navigation of the autonomous vehicle using subsequent trajectory predictions generated by the updated prediction layer to avoid navigating into non-drivable areas.

2. The system of claim 1, wherein the prediction layer comprises a deep learning neural network.

3. The system of claim 1, wherein the distance metric comprises a sum of one or more distances between the one or more waypoints and the one or more corresponding drivable areas.

4. The system of claim 1, wherein the one or more waypoints occur at discrete time intervals.

5. The system of claim 1, wherein the road data comprises at least one of light detection and ranging (LiDAR) data, radio detection and ranging (RADAR) data, ultrasonic data, Inertial Measurement Unit (IMU) data, Global Navigation Satellite System (GNSS) data, map data, pose data, or a combination thereof.

6. The system of claim 1, wherein each of the one or more corresponding drivable areas is identified on a pre-existing map corresponding with an environment associated with the AV.

7. A method comprising:

receiving road data, wherein the road data represents a real-world environment encountered by an autonomous vehicle (AV);

generating, using a prediction layer of the AV, a predicted trajectory of a target vehicle, wherein the predicted trajectory comprises one or more waypoints and wherein the predicted trajectory is based on the road data;

calculating a distance metric for the predicted trajectory, wherein the distance metric is based on a distance between the one or more waypoints and one or more corresponding drivable areas, wherein the distance metric comprises a sum of one or more distances between the one or more waypoints and the one or more corresponding drivable areas;

updating the prediction layer of the AV based on the distance metric; and controlling navigation of the autonomous vehicle using subsequent trajectory predictions generated by the updated prediction layer to avoid navigating into non-drivable areas.

8. The method of claim 7, wherein the prediction layer comprises a deep learning neural network.

9. The method of claim 7, wherein the one or more corresponding drivable areas are nearest drivable areas to the one or more waypoints.

10. The method of claim 7, wherein the one or more waypoints occur at discrete time intervals.

11. The method of claim 7, wherein the road data comprises at least one of light detection and ranging (LiDAR) data, radio detection and ranging (RADAR) data, ultrasonic data, Inertial Measurement Unit (IMU) data, Global Navigation Satellite System (GNSS) data, map data, pose data, or a combination thereof.

12. The method of claim 7, wherein each of the one or more corresponding drivable areas is identified on a pre-existing map corresponding with an environment associated with the AV.

13. A non-transitory computer-readable storage medium comprising at least one instruction for causing a computer or processor to:

receive road data, wherein the road data represents a real-world environment encountered by an autonomous vehicle (AV);

generate, using a prediction layer of the AV, a predicted trajectory of a target vehicle, wherein the predicted trajectory comprises one or more waypoints and wherein the predicted trajectory is based on the road data;

calculate a distance metric for the predicted trajectory, wherein the distance metric is based on a distance between the one or more waypoints and one or more corresponding drivable areas, wherein the one or more corresponding drivable areas are nearest drivable areas to the one or more waypoints;

update the prediction layer of the AV based on the distance metric; and control navigation of the autonomous vehicle using subsequent trajectory predictions generated by the updated prediction layer to avoid navigating into non-drivable areas.

14. The non-transitory computer-readable storage medium of claim 13, wherein the prediction layer comprises a deep learning neural network.

15. The non-transitory computer-readable storage medium of claim 13, wherein the distance metric comprises a sum of one or more distances between the one or more waypoints and the one or more corresponding drivable areas.

16. The non-transitory computer-readable storage medium of claim 13, wherein the one or more waypoints occur at discrete time intervals.

17. The non-transitory computer-readable storage medium of claim 13, wherein the road data comprises at least one of light detection and ranging (LiDAR) data, radio detection and ranging (RADAR) data, ultrasonic data, Inertial Measurement Unit (IMU) data, Global Navigation Satellite System (GNSS) data, map data, pose data, or a combination thereof.

* * * * *